July 3, 1951  A. DOSCHEK  2,559,116

DISPENSING VALVE

Filed Dec. 11, 1945

INVENTOR
Antony Doschek
By Green + McCallister
His Attorneys

Patented July 3, 1951

2,559,116

UNITED STATES PATENT OFFICE 2,559,116

DISPENSING VALVE

Antony Doschek, Crafton, Pa., assignor of one-half to George O. Paff, Baltimore, Md.

Application December 11, 1945, Serial No. 634,227

10 Claims. (Cl. 251—135)

1

This invention pertains to valve devices for controlling the flow of a fluid and particularly to valvular means for closing off and controlling fluid flow to a suitable means such as a dispenser.

Previous to the present invention, there have been various types of valvular arrangements, but it is believed that none have combined simplicity with qualities of long life, effectiveness and foolproofness.

It has thus been an object to provide an improved fluid control device for liquids or gases or for a combination thereof.

Another object has been to provide a highly effective valvular device having a simplified and improved action.

A further object has been to devise foolproof means for limiting wear of working parts and for insuring uniformity of valvular action.

These and many other objects of my invention will appear to those skilled in the art from the drawings, specification and claims.

Although the device is particularly adapted for utilization in dispensing fluids such as carbonated water, soft drinks, etc., its application is not limited thereto, in that it has various other uses, adaptations and applications that will be obvious to those skilled in the art.

Figure 1:
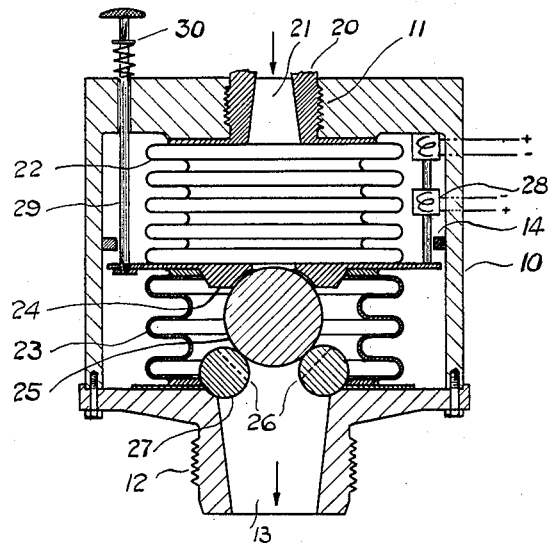
Figure 2:
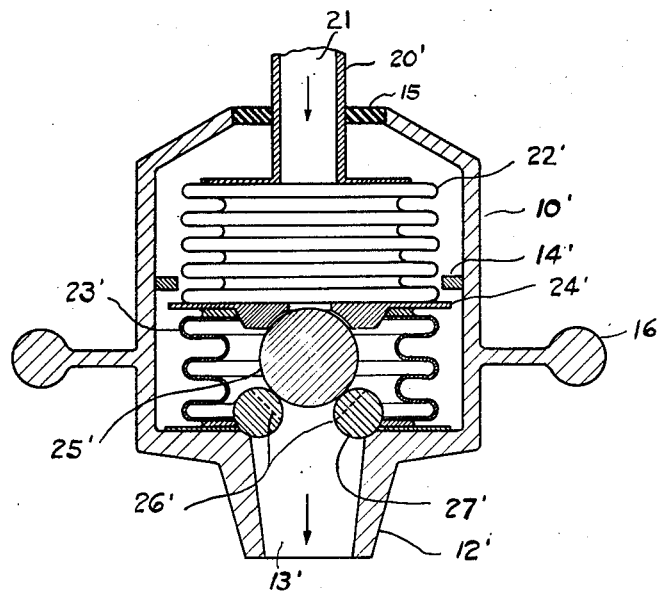

Figure 1 of the drawings is a vertical view, partially in section, of an embodiment of the present invention; and Fig. 2 is a similar view of a slightly modified form of valve mechanism wherein the housing or the housing is threaded at 11 to receive an an- be employed to operate the mechanism.

Referring particularly to Fig. 1, a housing portion 10 is provided with an outlet nozzle or orifice 13 for the fluid that may be suitably threaded as indicated by 12. At the other end, the housing is threaded at 11 to receive an annular shaped nipple or fluid inlet fitting 20; fluid preferably enters through an opening 21.

A bellows or Sylphon 22 is mounted adjacent one end of the housing 10 and a bellows or Sylphon 23 is mounted adjacent the other end thereof. The valve operating parts are in effect operably mounted within fluid reaches or sealed-off passageways of the bellows; the bellows thus serve as a fluid conduit or housing. A movable annular or disk-like valve seat member 24 is positioned between bellows 22 and 23 and is adapted to receive a spherical or ball valve member 25. The ball valve member 25 is freely mounted between curved and if desired, conical faces or seating surface portions of the valve

2 seat member 24 and an annulus-like ball retaining support ring 27. The ring 27 is suitably slotted at spaced intervals, see 26, in such a manner as to permit the passage of fluid therethrough and at the same time to provide a bearing surface between slots for the valve element 25.

The pair of extensible and contractible Sylphon bellows 22 and 23, as indicated in Fig. 1, are in a longitudinally disposed co-operative relationship with respect to each other and are connected, and if desired, welded together as fluid sealed chambers to provide a flow of fluid therethrough when the ball-like valve element 25 moves off its seat 24. The pressure of the fluid flowing within the bellows 22 and 23 in effect normally keeps the valve closed while maintaining it in a flexibly, resiliently, or buoyantly positioned relationship with respect to the housing 10. The valve elements 25 may be opened by any suitable means; in the vertical position of the valve shown in Fig. 1, a force can be applied upwardly to the valve seat member 24 to compress bellows 22 and to open them away from the valve 25. An inwardly projecting lug or annulus 14 is employed to limit the relative movement between the valve 25 and its seat 24; it prevents the ball 25 from moving out of an operative relationship with seat 24 and support 27.

The bottom portion of bellows 23 as well as the support or retainer ring 27 are preferably secured together and to the housing 10 by some suitable means such as a weld. To permit ready inspection of the valve the housing 10 of Figure 1 is shown made up of bolted sections.

As an example, a single-acting electrical solenoid co-operating with the valve seat element 24 may be actuated to open the valve, and if desired the device 28 may, as shown, have a second solenoid connected to seat member 24 to aid the fluid in closing it. To the left of Fig. 1, a manually operated longitudinally movable shaft 29 is shown operatively disposed, and if desired, securely connected to the movable valve seat member 24. This adjusting shaft or rod 29 is shown as held in its downward position by a spring 30, key-mounted thereon. As will be appreciated, the means 28 and 29 are shown as examples of apparatus that may be employed, but it will be apparent that any other suitable actuating means or combination thereof whether manually, mechanically, electrically, or fluid operated may be employed.

In the modification shown in Fig. 2, similar parts have been given the same number with prime suffixes. In this modified arrangement, the housing 10' is provided with a hand grip or rim portion 16 and the inlet member 20' is mounted within a suitable resilient or elastic extension or grommet 15 of the housing 10'. The housing 19' is slidably positioned on inlet 20', thus, the position of the valve can be controlled by moving the housing longitudinally with respect to the fluid inlet member 20'. Any suitable external operating means such as a lever and cam mechanism may be operatively connected to the housing 10' and actuated mechanically, electrically or by a fluid, if desired.

The bellows or extensible and contractible conduit portions 22 may be designed to exert a lesser force than the bellows portions 23, or vice versa. However, the portions 22 and 23 preferably position the valve parts in a balanced relationship therebetween to normally maintain the valve 25 in a closed relation with its seat 24. We also contemplate providing portions 22 and 23 that may exert substantially equal forces in contracting or extending, or unequal forces in one direction and equal forces in another, or any suitable combination thereof. If desired, a single bellows portion may be employed, although we prefer a pair of bellows portions. It will appear that in accordance with our invention, the valve parts are in effect flotatably positioned within the housing and that the fluid flow is sealed off from the housing 10, thus insuring trouble-free operation, even when normally troublesome liquids, such as those containing gases, for example, carbonated water, are being dispensed. The forces provided, may, on the other hand, be arranged to keep the valve in a normally open rather than a closed position.

In operation, the seat 24 is raised by any suitable agency such as 28 or 29 (Fig. 1) or 10' (Fig. 2), allowing fluid from inlet 21 to escape past valve 25, through passages 26 of support 27 to the outlet 13; this reduces fluid pressure in bellows 22 and substantially equalizes it with the fluid pressure within bellows 23. When the raising force is released, the normal closing force of the bellows 22 and 23 becomes effective to lower the seat 24 and close off fluid flow, thus building up fluid pressure in bellows 22 to expand them and increase the closing force. As fluid flows past valve 25, it jostles and rotates the ball on its support or retainer 27 to thereby automatically provide a new seating position after each operation. This minimizes and provides uniform wear of contacting valve parts. The spring-like action of bellows 22 and 23 as well as the pressure of fluid in the inlet bellows forces a tight seal between curved surface portions of the valve parts in their closed position. It will be noted that no portions of the apparatus for opening the mechanism are wetted by the fluid. All parts of the device are preferably of metal or of some other suitable material depending upon the type of fluids being handled; stainless steel may be used to prevent attack by corrosive fluids.

Although I have described several embodiments and applications of this invention, it will be apparent that many changes, substitutions, modifications, additions and omissions or combinations thereof may be made in connection therewith without departing from the spirit and scope of the invention as indicated by the appended claims.

What I claim is:

1. In a fluid control device having a pair of spaced-apart fluid nipples, a fluid-pressure-sensitive bellows defining a fluid passage therethrough and secured in a fluid sealed-off relationship at one end thereof to one of the fluid nipples, a valve seat member spaced from said first-mentioned fluid nipple and mounted on said bellows to extend across the fluid passage therethrough, said valve seat member being flexibly supported on said bellows in such a manner as to move with said bellows, said bellows being connected at an opposite end in a fluid sealed-off relationship to the other fluid nipple, an annulus-like support ring secured on the other fluid nipple and within said bellows, and a ball-like valve element operably positioned between said valve seat member and said support ring, actuating means operably connected to said valve seat member for moving it with respect to said ball-like valve element said valve element being constructed and arranged to engage said valve seat member to close off fluid flow along the fluid passage through said bellows and to move off said valve seat member to by-pass fluid flow through the passage in accordance with relative spacing between said support ring and said valve seat member, said support ring having a portion constructed and arranged to pass fluid between said support ring and said valve element when said valve element is in engagement with said support ring.

2. A device as defined in claim 1, wherein a housing is provided, said housing being secured at one end to one nipple of said pair and extending about said bellows, and at its other end, to support the other nipple of said pair.

3. A device as defined in claim 2, wherein means is mounted on said housing and is constructed and arranged to engage said valve seat member and control its movement independently of the fluid pressure in said bellows.

4. A device as defined in claim 2, wherein said housing is provided with a projecting portion constructed and arranged to engage said valve seat member and control its movement independently of the fluid pressure in said bellows.

5. In a fluid dispensing device having a housing and a pair of spaced-apart fluid nipples positioned at opposite ends of the housing, a fluid-pressure-sensitive bellows defining a fluid passage therethrough and secured in a fluid sealed-off relationship at one end thereof to one of said fluid nipples, and at the other end thereof to the other of said fluid nipples, a pair of spaced-apart valve support members, one of said valve support members being spaced between said fluid nipples and being flexibly supported on said bellows to extend across the fluid passage therethrough, the other of said valve support members being secured to one of said fluid nipples and about the fluid passage through said bellows, one of said valve support members being provided with a valve seat thereabout, a ball-like valve operably positioned between said pair of valve support members and being constructed and arranged to move therebetween and to engage the valve seat of one of the said support members to close off fluid flow through the fluid passage of said bellows and to move off said seat to by-pass fluid flow through the passage in accordance with relative spacing between said pair of valve support members, the other of said valve support members being of ring-like construction and having portions constructed and arranged to pass fluid between said ball valve and said support member when said valve is in engagement therewith.

6. A device as defined in claim 5, wherein the fluid passing portions of said ring-like support member are provided with a plurality of spaced slots along said ring-like support member.

7. A device as defined in claim 5, wherein one of said fluid nipples is securely mounted on the housing and the other of said nipples is adjustably mounted with respect to the housing.

8. A device as defined in claim 2, wherein said bellows are biased to normally hold said valve seat member in a seating relationship with respect to said valve element, and said actuating means is manually actuated to move said valve seat member out of a seating relationship with respect to said valve element.

9. A device as defined in claim 5, wherein electrical-mechanical means is operably connected to the valve seat of said one of the said support members for moving it with respect to said ball-like valve.

10. In a fluid dispensing device having a housing provided with a fluid inlet through one end thereof and a fluid outlet through an opposite end thereof, a valve element, a valve seating element, a pair of flexible bellows disposed within the housing, said valve seating element being connected to adjacent end portions of said pair of bellows, the other end of one of said pair of bellows being connected to the fluid outlet of the housing, a fluid supply means slidably positioned to extend into the housing through the fluid inlet thereof and being connected to the other end of the other of said pair of bellows, said pair of bellows and said valve seating element defining a fluid passageway from said fluid supply means to the fluid outlet of the housing, means within the housing operably positioning said valve element with respect to said valve seating element, and actuating means for moving said housing with respect to said fluid supply means in such a manner as to move said valve and seating elements with respect to each other to thereby control fluid flow.

ANTONY DOSCHEK.

REFERENCES CITED

The following references are of record in the file of this patent:

UNITED STATES PATENTS

| Number | Name | Date |
|---|---|---|
| 1,602,047 | Schultheis | Oct. 5, 1926 |
| 1,958,814 | Carson, Jr. | May 15, 1932 |
| 2,052,346 | Ray | Aug. 24, 1936 |
| 2,121,354 | Johnson | June 21, 1938 |
| 2,198,404 | Conill | Apr. 23, 1940 |
| 2,215,491 | Ziegler | Sept. 24, 1940 |
| 2,302,089 | Aller | Nov. 17, 1942 |
| 2,376,383 | Richards | May 22, 1945 |
| 2,406,120 | Wirth | Aug. 20, 1946 |

FOREIGN PATENTS

| Number | Country | Date |
|---|---|---|
| 596,938 | France | of 1925 |

Certificate of Correction

July 3, 1951

Patent No. 2,559,116

ANTONY DOSCHEK

It is hereby certified that error appears in the printed specification of the above numbered patent requiring correction as follows:

Column 1, line 33, for "is threaded at 11 to receive an an-" read *supplemented by fluid pressure may*; column 2, line 19, for the word "elements" read *element*; column 3, line 6, for "housing 19'" read *housing 10'*;

and that the said Letters Patent should be read as corrected above, so that the same may conform to the record of the case in the Patent Office.

Signed and sealed this 28th day of August, A. D. 1951.

[SEAL]

THOMAS F. MURPHY,
*Assistant Commissioner of Patents.*